(12) United States Patent
Krevet

(10) Patent No.: US 7,089,169 B2
(45) Date of Patent: Aug. 8, 2006

(54) METHOD FOR COUPLING PHYSICAL AND GEOMETRICAL CALCULATION PROGRAMS TO A DATA PROCESSING SYSTEM

(75) Inventor: Berthold Krevet, Dettenheim (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 416 days.

(21) Appl. No.: 10/637,724

(22) Filed: Aug. 8, 2003

(65) Prior Publication Data

US 2004/0034679 A1 Feb. 19, 2004

Related U.S. Application Data

(63) Continuation-in-part of application No. PCT/EP02/00530, filed on Jan. 19, 2002.

(30) Foreign Application Priority Data

Feb. 12, 2001 (DE) ................................ 101 06 639

(51) Int. Cl.
*G06F 17/50* (2006.01)
*G06F 19/00* (2006.01)

(52) U.S. Cl. ................... 703/13; 703/6; 703/7; 703/20; 703/21; 703/22; 715/526; 716/20

(58) Field of Classification Search .................... 703/6, 703/7, 13, 20, 21, 22; 715/526; 716/20
See application file for complete search history.

(56) References Cited

U.S. PATENT DOCUMENTS

| 4,914,568 | A | * | 4/1990 | Kodosky et al. | ............ 715/763 |
| 5,255,363 | A | * | 10/1993 | Seyler | ........................ 715/526 |
| 5,883,623 | A | * | 3/1999 | Cseri | .......................... 715/866 |
| 5,963,731 | A | * | 10/1999 | Sagawa et al. | ................. 703/6 |
| 6,286,017 | B1 | * | 9/2001 | Egilsson | ..................... 715/503 |
| 6,784,902 | B1 | * | 8/2004 | Melder et al. | ............... 715/771 |

OTHER PUBLICATIONS

Diekmann et al., "PadFEM: A Portable Parallel FEM-Tool", in Liddell et al, editors, High-Performance Computing and Networking (HPCN'96), pp. 580-585, Springer, LNCS 1067, 1996.*

* cited by examiner

*Primary Examiner*—Kamini Shah
*Assistant Examiner*—Herng-der Day
(74) *Attorney, Agent, or Firm*—Klaus J. Bach

(57) ABSTRACT

In the calculation or simulation of technical components for use in a technical system wherein calculation programs are provided for various physical variables which are taken into account on a case-to-case basis, a preprocessing method is provided in order to couple programs for physically and geometrically calculating such a component without the need for the creation of a tailor-made calculation program for a specific component. The procedural setup of the processing steps permits a modular composition of the calculation process for the simulation of any type of component subjected to physical influences.

3 Claims, 5 Drawing Sheets

METHOD FOR COUPLING PHYSICAL AND GEOMETRICAL CALCULATION PROGRAMS TO A DATA PROCESSING SYSTEM

This is a Continuation-In-Part application of international application PCT/EP02/00530 filed Jan. 19, 2002 and claiming the priority of German application 101 06 639.2 filed Feb. 12, 2001.

BACKGROUND OF THE INVENTION

The invention relates to a method for coupling physical and geometrical calculation programs in a data processing system whereby interrelated physical values as well as geometrical values are calculated upon simulation of a component for technical applications.

For the calculations of complex technical components, it is often necessary to utilize several computational programs. It is for example necessary in the calculation of thermal tensions in a body, to first determine the temperature distribution in the body. The two calculations are performed by different programs. Generally, the Finite Elements Method (FEM) is used.

To establish with the programs needed for the calculation a single computational program, is not reasonable since the data storage requirements and the computation time grow in the second power with the number of the physical values to be calculated. If the calculations are performed individually, there is however the problem of the automatization of calling up the various programs and of the data exchange. Often a value calculation is necessary only for a partial area of a component and requires individual networking, so that different networks are required for a complicated calculation.

U.S. Pat. No. 5,963,731 discloses a method for supporting the execution of several simulation programs for coupled simulations. Each of a plurality of simulation programs is in communication with a data library and is executed as an execution process. With each simulation process a data conversion is performed. By the exchange of data resulting from the simulation by the simulation process of one of the simulation programs with simulation processes of the other simulation programs, the data conversion process, which is provided for a transmission simulation process, determines a receiving simulation process, to which the data must be transmitted and submits the data to the data conversion process which is part of the receiving simulation process. The data conversion process for the receiving simulation process performs a data conversion in order to catch the difference between the basis of the transmission simulation process and the basis of the receiving simulation process. There are no operating elements, which permit a simple operation, a calculation program.

It is the object of the present invention to provide a method by which calculating programs for the calculation of physical and geometrical values can be rapidly linked for the simulation of a new technical design element with regard to its geometry and its technical properties. The program coupling should not be a code specifically designed for an individual design element; rather the coupling should, before the specific calculation, be suitable for any simulation task.

SUMMARY OF THE INVENTION

In the calculation or simulation of technical components for use in a technical system wherein calculation programs are provided for various physical variables which are taken into account on a case-to-case basis, a preprocessing method is provided in order to couple programs for physically and geometrically calculating such a component without the need for the creation of a tailor-made calculation program for a specific component. The procedural setup of the processing steps permits a modular composition of the calculation process for the simulation of any type of component subjected to physical influences.

To solve this problem, a program packet for controlling the calculation, the pre-processing, is developed which has the following properties:

I. All calculation programs needed for a calculation and the order of their call-up are written into a file.

II. All tasks, which are to be performed by the various programs when being called up, are also written into the file in the form of commands, which are combined in enumerated SCRIPTs.

III. In order to make as few as possible changes in the calculation programs present an interpreter program is associated with each calculation program which interprets the commands and executes the respective conversion. These may be export commands for data for another calculation program, changes of volume data and boundary conditions or control commands for the calculation program. The order of call-up for the interpreter programs must also be stored in the file.

IV. A supervisory control program starts all the calculation programs and the respective interpreter programs. With each call-up of an interpreter program, the respective SCRIPT is transferred to the program.

As a result of this pre-processing procedure the calculations of a design component can be performed in an automatic order of steps which can be assembled in a simple way differently for different tasks that is they are not cast into a particular order.

In order to simplify the input and control of complicated calculation processes, this pre-processing, that is the method for the coupled simulation/calculation of a technical component, was developed. FEM- and coupling programs are in existence. They are coupled for the determination of the call-up order and tasks. This is done in an interactive way on a screen connected to a powerful computer in a manner as described in the Abstract of the Disclosure.

The computer programs are not identified by their names but by operator symbols for the corresponding physical values, which they calculate. The program TOSCA, which calculates electrical and magnetic fields, is for example identified by the operator symbols E and B. All operators are presented on the screen in one plane. For each operator, the other operators, on which it may be dependent, are provided in brackets for example magnetic field B(T, E, j) that is on the temperature T, the electric field E and the current density j.

Besides the operator symbols for the calculation of physical values there are also symbols for a meshed network generator for the FEM-programs and for the meshed network describing only the geometry. Calculated physical values are therefore available directly for changing the meshed network or the geometry.

In order to activate the dependencies, the operators contained in brackets are provided with an indication device, for example, the PC mouse and selected by clicking. For performing a calculation, the operators are then dragged with the mouse onto a central action field of lines and columns in this plane, which is the matrix. Each field element of the matrix corresponds to a calculation procedure. If one operator is dependent on other operators, these operators are also automatically introduced into the column of the one operator.

The programs are called up in accordance with the arrangement of the operators in the columns in the order from top to bottom. If one column is completed the next column is called up.

A column may also be repeatedly worked down if physical values are iteratively calculated following the same scheme. The number of iterations is noted in an input field above the column in the input line, repeat steps.

For the calculation of time dependent procedures, each column is assigned a certain time interval. The time interval is entered in an input field below the column in the line "time".

In the action field, which is filled with operators, operators can be selected individually or in groups, SCRIPT builders, in order to assign to them special tasks for the calculation procedure in the form of SCRIPTS. The SCRIPTS include at least commands for the export of data, for changing the boundary conditions and material data and control parameters of the programs.

By the commands: "before calculation do" or "after calculation do", which are placed in front of the command sequence, it is indicated whether the command sequence is to be executed ahead of, or after, a calculation program.

The number of a SCRIPT assigned to an operator is indicated in the operator symbol pulled onto the action field. It can therefore be immediately recognized, in which order the calculation programs are called up and which task is performed with each call. A part of the SCRIPT commands is automatically generated if the dependencies between the operators are defined.

With the pre-processor a list, that is a boundary set up, is interactively generated in which it is indicated for example for boundary areas which are marked by numbers, which boundary conditions are valid herefor with the various calculations. When such a list is present, the respective commands for the transfer or generation of the boundary conditions are automatically entered in the respective SCRIPTS.

The method or, respectively, the pre-processor has the following advantages:

A simple assembly and coupling of calculation programs for the simulation of a technical component as it is exposed in a technical system to certain natural forces.

A clear arrangement of all the physical values to be calculated and their interdependencies on the field or surface of a display screen connected to a data processor.

The interactive compiling of the complete calculation procedure by dragging and dropping of symbols of the values to be calculated into the action field disposed in the center area of the display screen.

The invention will be described below in greater detail on the basis of the accompanying drawings.

DESCRIPTION OF A PREFERRED EMBODIMENT

Before the method of the coupled simulation of the technical component to be simulated is activated, a model thereof is setup wherein surface elements and volume elements are marked by numbers. This may be for example a type of wire or edge model. If this model does not exist yet, from the coupling program "Build a model", FIGS. 1 and 2 can be called up above the line "repeat steps" as a program for generating a model.

Figure 1:
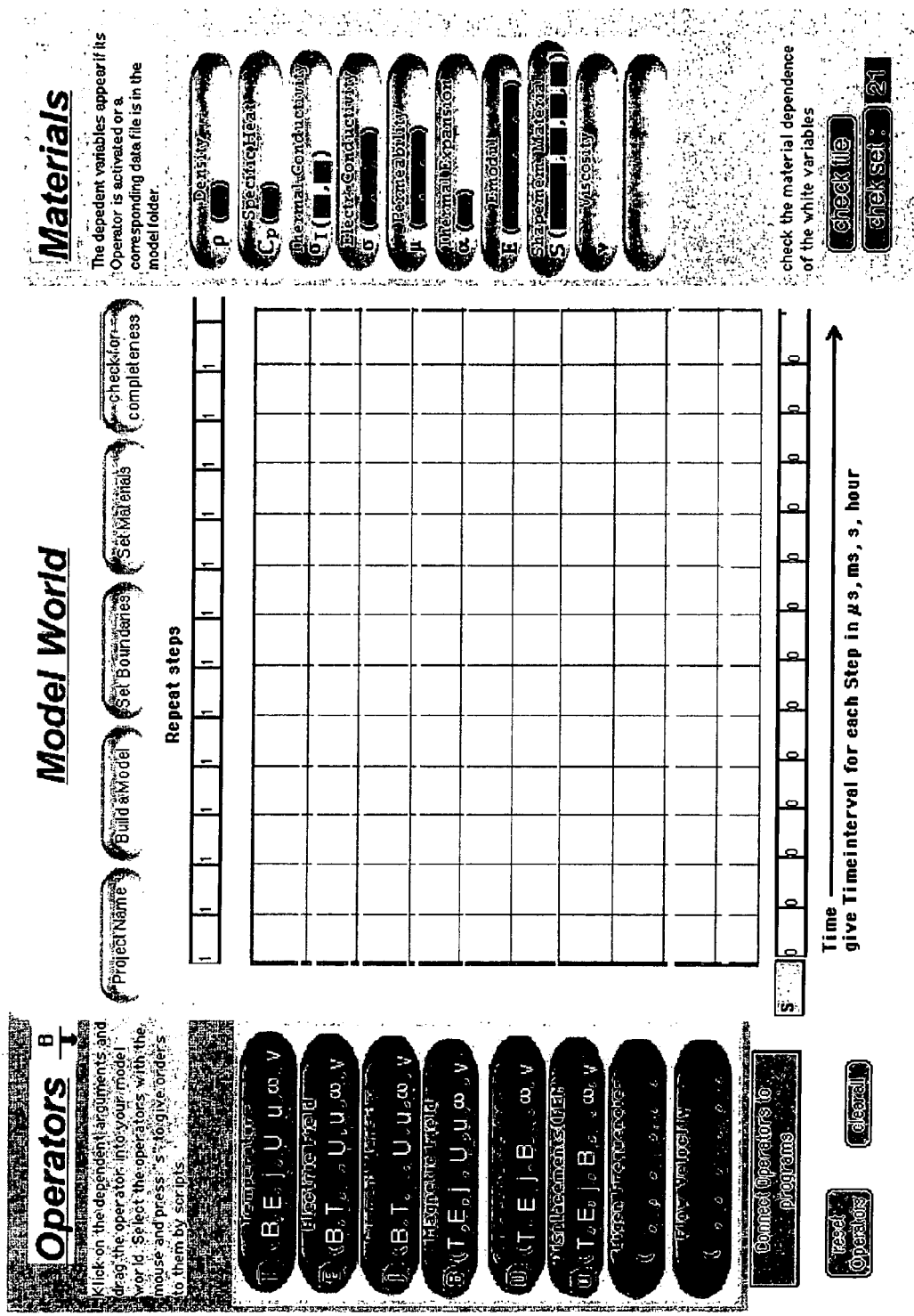
FIG. 1 shows the pre-processor screen without input.
Figure 2:
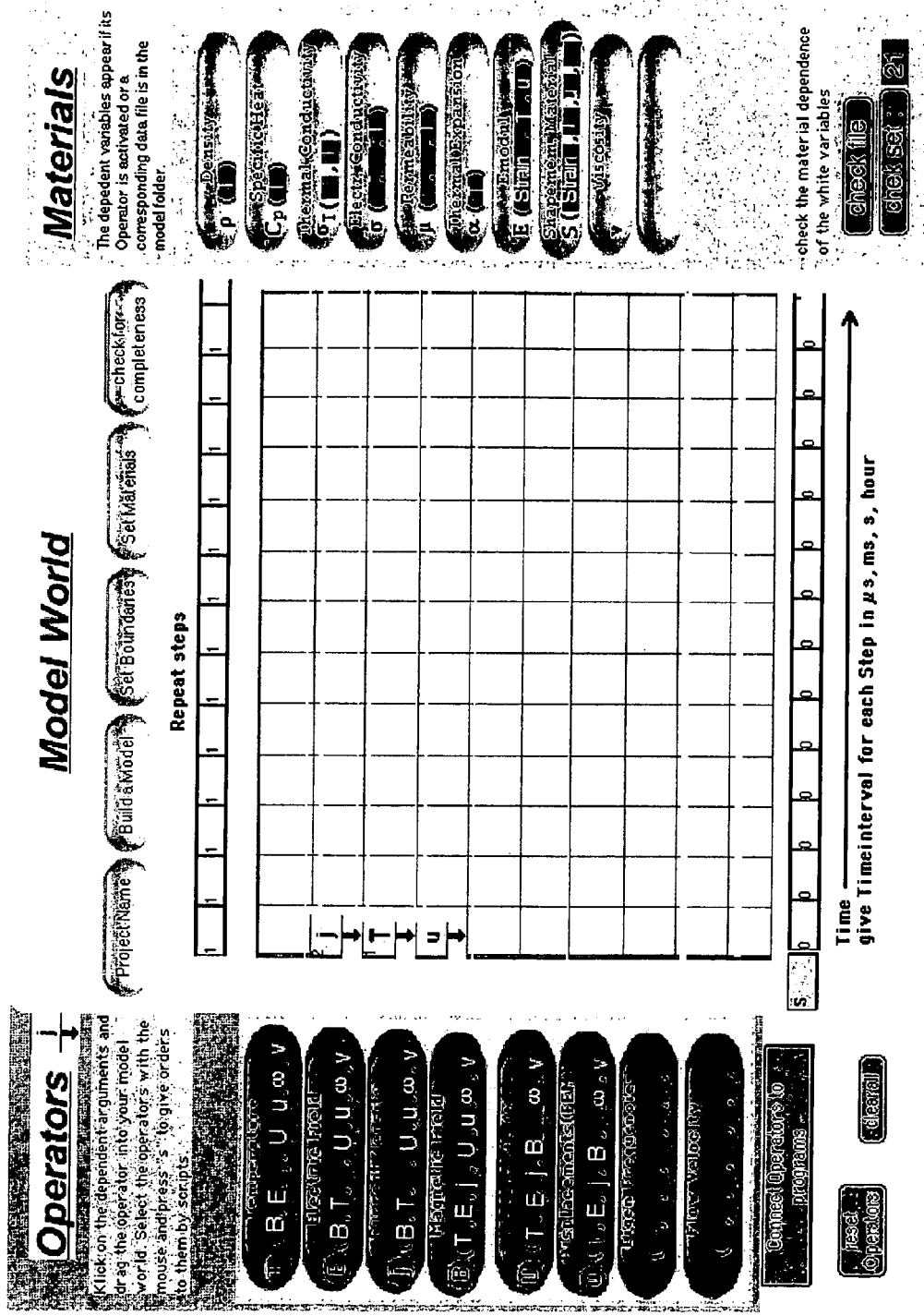
FIG. 2 shows the pre-processor screen with an input sample.

For each volume element marked by a number, a set with material data, FIGS. 1 and 2, right column in each picture, for the value of the data is present. The material data may be constants or they may depend on one or several other physical values and/or defined by corresponding characteristic lines. In both FIGS. 1 and 2, the material operators are for example listed in columns. All material data are combined in a file. It is generated by the coupling program or if it is present as a file it is copied into the calculation file.

For the marked surfaces of the model, it is indicated for each calculation of the selected physical values, which value the boundary condition has and of which type it is. This is controlled by the program in two ways:

By a selection of the screen numbers and an indication of the characteristic numbers in a table.

By corresponding SCRIPT commands which are executed before or after a calculation.

The descriptions in the figures are provided in the English language commonly used in this technical field by the person skilled in the art.

FIG. 1 shows the screen/surface ready for the interactive input of the coupled FEM simulation after start. The action field, in which the order of the calculation program recalls is entered by dragging and dropping the operators, is disposed with its chess-like structure in the center of the surface. In the line above, the number of identical repetitions of the assigned gap series is introduced. Below the action field, there is the line in which in columns for time-dependent calculations, the time interval belonging to each calculation sequence is indicated. At the left edge, the operators T, E, j, B, U, u are shown still as empty fields, the operator for the characteristic frequency calculation and the operator for the flow speed are stacked up, wherein each is representative for the calculation with a computer program, generally a FEM program.

The operator for calculating the temperature T is in this case for example dependent: on the magnetic field B, on the electrical field E, on the current density j, on the macro lattice network $U_1$, on the deflection u with the FEM, on the characteristic frequency $\omega$ and on the flow speed v; the operator for calculating the electrical field E is dependent on B, T, U, u, $\omega$ and v;

the operator for calculating the magnetic field B is dependent on T, E, j, U, u, $\omega$ and v;

the operator for calculating the macro-lattice network U, the lattice network generator, is dependent on T, E, j, B, $\omega$ and v;

the operator n for the FEM calculation is dependent on T, E, j, B, $\omega$ and v.

The operator for the characteristic frequency is indicated in this case as being not yet ready, and so is the operator v for the flow speed.

The dependencies of the operators are indicated by their respective arguments. The dependencies are set by the indicator, that is, the mouse, by clicking on the dependent operators in the argument listing given in brackets.

At the right side of the action field, there are the material parameters of the components listed on top of one another, which can or must be taken into consideration in the calculation. The material operators may be dependent. This may be indicated, like with the operators, by arguments at the left side of the field. Listed are here:

The density $\rho$, the specific heat $C_p$, the heat conductivity $\sigma_T$, the electric conductivity $\sigma$, the permeability $\mu$, the heat expansion $\alpha$, the E-module E, the shape memory material S, the viscosity v and the density $\zeta$. The possible dependencies are represented in the argument listing only when corresponding operators for the calculation are present on the action screen. At the bottom, there is an empty field for another operator.

For an explanation of the principle, FIG. 2 shows in the first column of the action screen, a simple calculation series Here the EEM-calculation of the temperature dependent displacement of a component by the operator u is to be performed.

The component is electrically heated, therefore the temperature which is calculated by the operator T depends on the heating current density j. These dependencies are stored in the argument area in the operator symbols. Only the operator u must be dragged onto the action screen. The dependent operators are all automatically set and obtain predefined SCRIPTS, which define the coupling among them. The number of the SCRIPT is shown in the left upper corner of the operator representation. The operator T is here assigned to the SCRIPT 1. The operator j is assigned to the SCRIPT 2.

Now the operators for the calculation of the expansion, the strain, and for the calculation of the temperature are active; the material parameter may be dependent thereon for the calculation. This is indicated in that, with the respective material parameters these dependencies are first represented in white color. They can be considered in the calculation only if lines characteristic for the respective materials are present for the dependency on an operator and are accessible to the calculation program, that is, if they are included in the material file. With the command key "check file" at the right bottom of FIG. 2, the material parameter is then activated and this is then represented by a black color if, at least for one material number, there is a characteristic line for the operator dependency of the parameter. This can be achieved with the key "check set", under "check file" if the characteristic line is present for a selected material number. If for example for the material number 1 the dependency of the E module on the strain is provided by a characteristic line, the variable "strain" is indicated to be active. If several such characteristic lines for different temperatures are present, also the variable T is indicated as active, that is it is shown in black.

Figure 3:
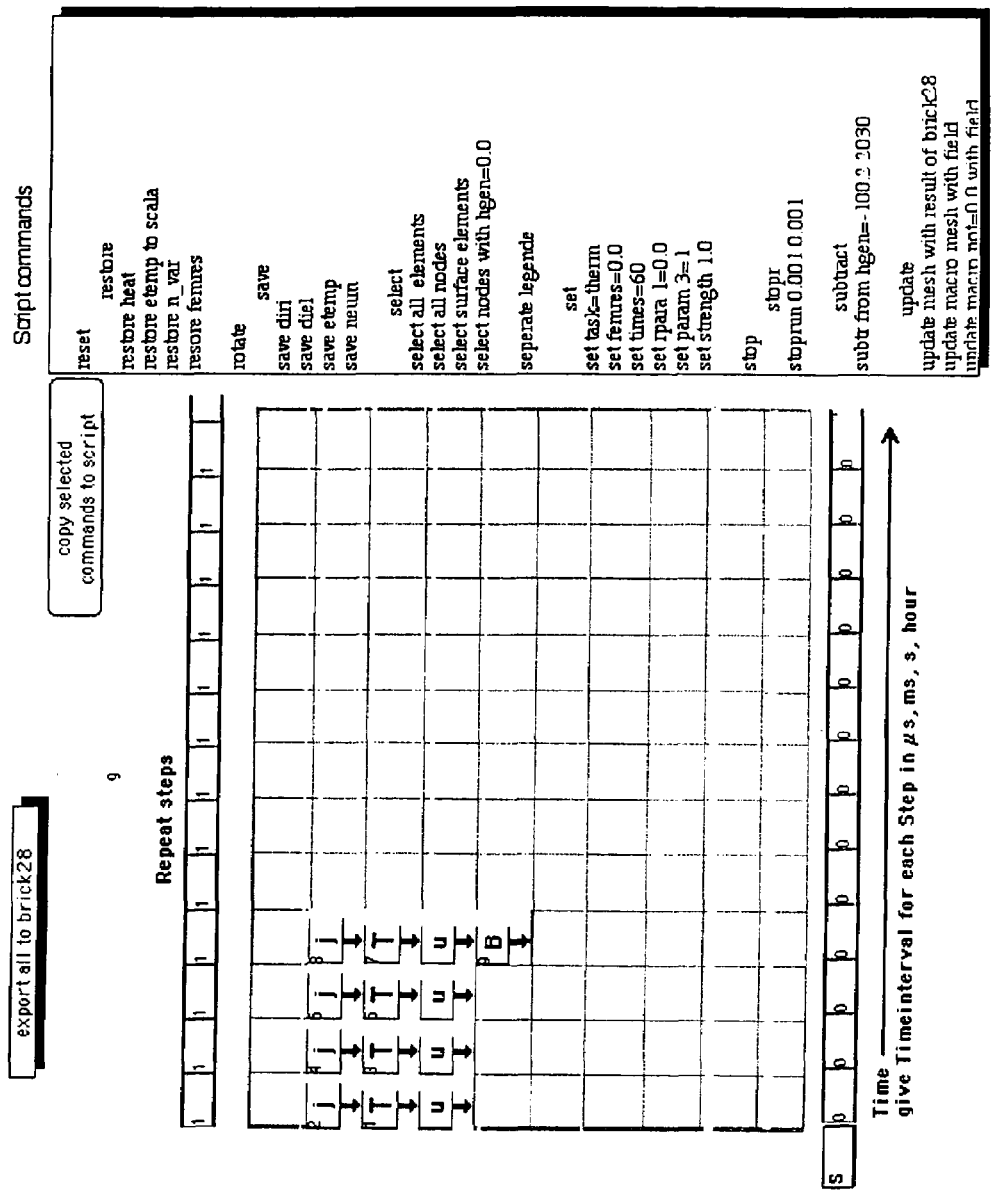
FIG. 3 shows the SCRIPT builder screen.

In FIG. 3, the shown calculation sequence for u is performed four times in a time-dependent manner, for the first column 10, for the second column also 10, for the third column 30 msec. In each sequence, the heating current is set by SCRIPT commands for the operator j. As a result, automatically complete characteristic lines are calculated. At the end of the last sequence, the magnetic field B of the deflected component is to be calculated and the results are to be used for a new calculation of the current. (Without particular inputs, the calculation time would be in sec.) To this end, the operator B in SCRIPT-No. 9 has obtained the SCRIPT commands "update mesh with result of u" and "export field to j".

The SCRIPT commands are selected in the listing given at the right of FIG. 3 and copied into the SCRIPT-edit-field at the left or they are directly entered.

Figure 4:
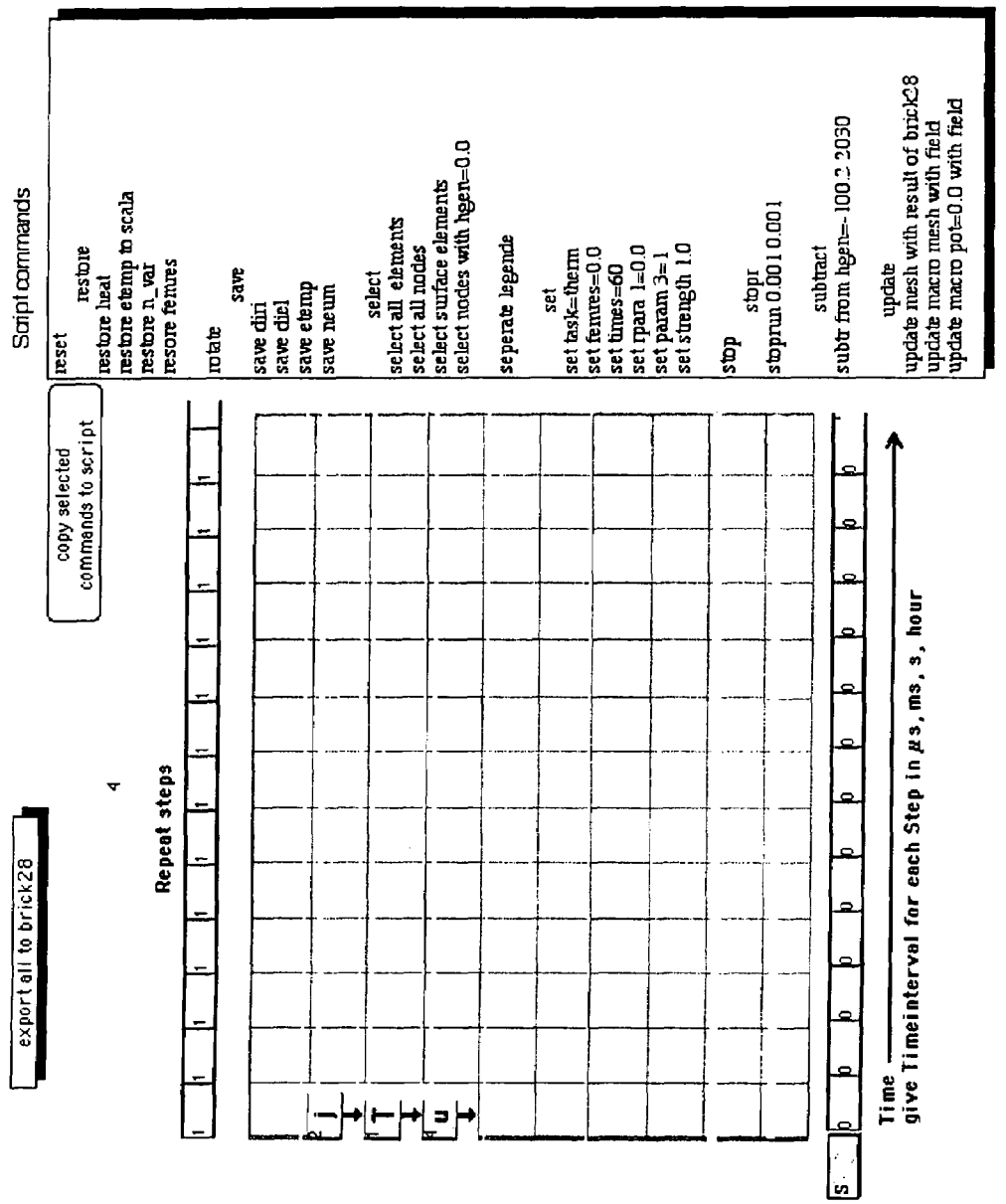
FIG. 4 shows the SCRIPT builder screen with a tool bar.

In FIG. 4, at the lower edge of the screen for example six tools are shown, by which SCRIPT commands can be generated. The tools appear after clicking with the mouse on the screen the originally closed briefcase. If the tools are dragged onto an operator on the action screen, they write tool-specific commands into the respective SCRIPT. If the operator does not have a SCRIPT yet, a new one is automatically generated. In FIG. 4, by way of the diskette symbol, the command "save frames" and by way of the pause symbol, the command "pause for diagnostic" are written and by way of the function symbol y=f(x)', the "function 2" is defined. Certain respective meanings are assigned to the other symbols.

Figure 5:
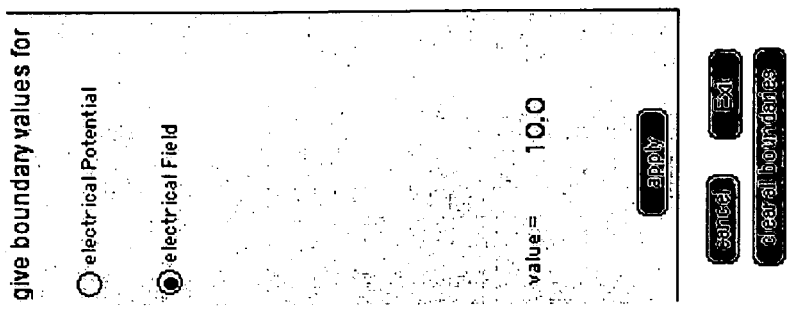
FIG. 5 shows the boundary set up.

In FIG. 5, the setting of the boundary conditions, Boundary setup, is represented by areas designated by numbers. In the example, the areas with the identification numbers 4 and 11, left column, are selected by black background indication. The operator E in white print is selected. Boundary conditions for the calculation of the electric field are set. See on the right side of the screen the demand for a boundary value setting, in this case for the electrical field. This may be a predetermined electrical potential, Dirichlet boundary condition, or the indication of the field value, Neuman boundary condition. In the present case, the electrical field value of 10V/m is given and automatically written into the listing.

For the marked areas, the boundary conditions for the other calculation programs are now indicated, one after the other. Based on these indications, boundary conditions can then be automatically generated by SCRIPT commands before the programs are called up for the calculation of the operators.

If the connections required for the actual calculation, that is the pre-processing, are completed, by clicking on the bottom "check for completeness" at the upper edge of the field above the action screen, it is once more checked by internal calculation whether the planned calculation procedure is compatible with the storage capacity or not. If yes, "run", appears in place of the bottom for the start of the calculation procedure; if not, the pre-processing must be once more examined. Upon activation of only one operator the "run" button appears immediately after clicking on the "check for completeness" button.

What is claimed is:

1. A method for coupling, preprocessing, physical and geometrical calculation programs in a data processing system whereby coupled physical values and geometric values are calculated upon simulation of a component for a technical application, said method comprising the following:

the calculation program for the calculation of the respective physical value is characterized by an operator symbol which indicates the physical value and each operator is provided, in brackets, as arguments with other operators on which it is dependent, all momentarily inactive operator symbols are deposited on a field represented on a screen coupled to the data processing system so as to be distinguishable in a clearly visible margin, additionally, symbols for a lattice net generator, for finite element method (FEM) programs and for a lattice net describing the geometry are introduced and are also visibly deposited in a margin of the field, all momentarily active operator symbols are clearly distinguishably from the others exhibited on a central action field on the field, the action field consists of lines and columns, that is, a matrix, with matrix elements each of which corresponds to a command for a calculation procedure and the column corresponds to a command sequence, the operators needed for a calculation are indicated at the margin and moved from there to a predetermined column of the matrix, wherein the operators on which such a moved operator is dependent, are also deposited automatically in the same column whereby the command sequence of the calculation procedure of the column is established, in the action field filled with operators, operators are selected individually or in groups by an indicator in order to assign to them special tasks in the calculation procedure in the form of SCRIPTS, which include also commands for the export of data, for changing the boundary conditions, material data and control parameters of the programs, wherein the SCRIPT commands are automatically generated if dependencies between the operators are defined, commands of the form "before calculation do" or "after calculation do" are placed ahead of the command sequence to indicate whether the specified commands should be executed before or after the calculation, in the action field the number of a SCRIPT assigned to an operator is indicated in the operator symbol, the SCRIPT commands can be given to an operator in the action window by dragging symbols representing a command or a sequence of commands onto the operator, and on the field, interactively, a list, a boundary set-up, is generated in which it is indicated which boundary conditions are valid for certain marked boundary areas.

2. A method according to claim 1, wherein each column is provided at its top with an input area for an indication of how many repeat steps are being performed and, at its bottom with an input area indicating a predetermined time interval for the calculation of time-dependent procedures, Time.

3. A method according to claim 1, wherein each column is provided at its top with an input area for an indication of how many repeat steps are being performed and, at its bottom with an input area indicating a predetermined time interval for the calculation of time-dependent procedures, Time.

* * * * *